United States Patent
Sakakida et al.

(10) Patent No.: US 7,153,333 B2
(45) Date of Patent: Dec. 26, 2006

(54) FUEL REFORMING SYSTEM OF A FUEL CELL

(75) Inventors: Akihiro Sakakida, Yokosuka (JP); Mikiya Shinohara, Yokohama (JP); Tadashi Shoji, Yokosuka (JP); Shiro Tanaka, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 180 days.

(21) Appl. No.: 10/415,988

(22) PCT Filed: Dec. 11, 2002

(86) PCT No.: PCT/JP02/12954

§ 371 (c)(1),
(2), (4) Date: May 6, 2003

(87) PCT Pub. No.: WO03/063279

PCT Pub. Date: Jul. 31, 2003

(65) Prior Publication Data

US 2004/0255514 A1    Dec. 23, 2004

(30) Foreign Application Priority Data

Jan. 23, 2002  (JP) ............................. 2002-013962
May 22, 2002  (JP) ............................. 2002-147421

(51) Int. Cl.
*C01B 3/48*    (2006.01)

(52) U.S. Cl. .......................... 48/61; 48/127.9; 422/108; 422/105; 422/110; 422/116; 429/12; 429/123

(58) Field of Classification Search .................... None
See application file for complete search history.

(56) References Cited

U.S. PATENT DOCUMENTS

| 3,955,941 | A | 5/1976 | Houseman et al. |
| 6,316,134 | B1 | 11/2001 | Cownden et al. |
| 6,455,008 | B1 * | 9/2002 | Aoyama et al. ............ 422/108 |

FOREIGN PATENT DOCUMENTS

| DE | 100 54 139 A1 | 5/2001 |
| EP | 1162171 A1 * | 12/2001 |
| JP | 2000-306594 | 11/2000 |
| JP | 2000-306594 A | 11/2000 |
| JP | 2000306594 | 11/2000 |

* cited by examiner

*Primary Examiner*—Glenn Caldarola
*Assistant Examiner*—Vinit H. Patel
(74) *Attorney, Agent, or Firm*—McDermott Will & Emery LLP (57) ABSTRACT

In a reforming reactor (31), a partial oxidation reaction is performed between a hydrocarbon fuel and air, and in a mixer (32), water is injected into hot gas heated by the partial oxidation reaction to vaporize the water, and the vaporized water is mixed with the hot gas. In a shift reactor (33), the vaporized water is made to undergo a shift reaction with the hot gas. In this way, a device for promoting vaporization of the water or a complex fuel injection device is not required.

17 Claims, 12 Drawing Sheets

FUEL REFORMING SYSTEM OF A FUEL CELL

FIELD OF THE INVENTION

The present invention relates to a fuel reforming system of a fuel cell.

BACKGROUND OF THE INVENTION

In a fuel cell which generates hydrogen rich gas supplied to the fuel cell by fuel reforming, in addition to hydrogen, carbon monoxide is generated in the reforming process, and carbon monoxide poisons the catalyst in the fuel cell. Therefore, a reforming system includes a shift reactor provided downstream of the reforming reactor to reduce the concentration of carbon monoxide.

Steam is required for the reforming reaction and shift reaction, and JP2000-306594A published by the Japanese Patent Office in 2000 discloses a method wherein the exhaust gas of the fuel cell is introduced into the reforming reactor to promote vaporization of the water supplied to the reforming reactor.

SUMMARY OF THE INVENTION

If water flows into the shift reactor in the liquid phase, the reaction efficiency of the shift reaction will fall. To avoid this, it is necessary to completely vaporize the water completely before it flows into the shift reactor. In the aforesaid prior art device, the exhaust gas from the fuel cell is introduced to the reforming reactor to promote vaporization of the water, but when the exhaust gas of the fuel cell is introduced, the molar fraction of hydrogen falls and the efficiency of the fuel cell therefore falls. Although the water can be atomized and vaporized by a fuel injection device, the water particles must be exceedingly fine to vaporize the atomized water, and the fuel injection device is necessarily complex and expensive.

It is therefore an object of this invention to promote vaporization of water by means of a simple construction when water is supplied to a reforming system, and to prevent water in the liquid phase from flowing into a shift reactor.

In order to achieve above object, the present invention provides a fuel reforming system of a fuel cell, comprising a reforming reactor into which hydrocarbon fuel and oxygen are introduced to perform a partial oxidation reaction, a mixer provided downstream the reforming reactor, which injects water into gas heated by the partial oxidation reaction to vaporize the water, and mix the vaporized water with the gas and a shift reactor provided downstream the mixer, into which the gas containing vaporized water is introduced, and which performs a shift reaction.

According to an aspect of the invention, this invention provides a fuel reforming method in a fuel reforming system of a fuel cell, comprising performing a partial oxidation reaction between a hydrocarbon fuel and oxygen, injecting water into gas heated by the partial oxidation reaction, and mixing the water vaporized thereby with the gas and performing a shift reaction between the vaporized water and the gas.

The details as well as other features and advantages of this invention are set forth in the remainder of the specification and are shown in the accompanying drawings.

DESCRIPTION OF THE PREFERRED EMBODIMENTS

Figure 1:
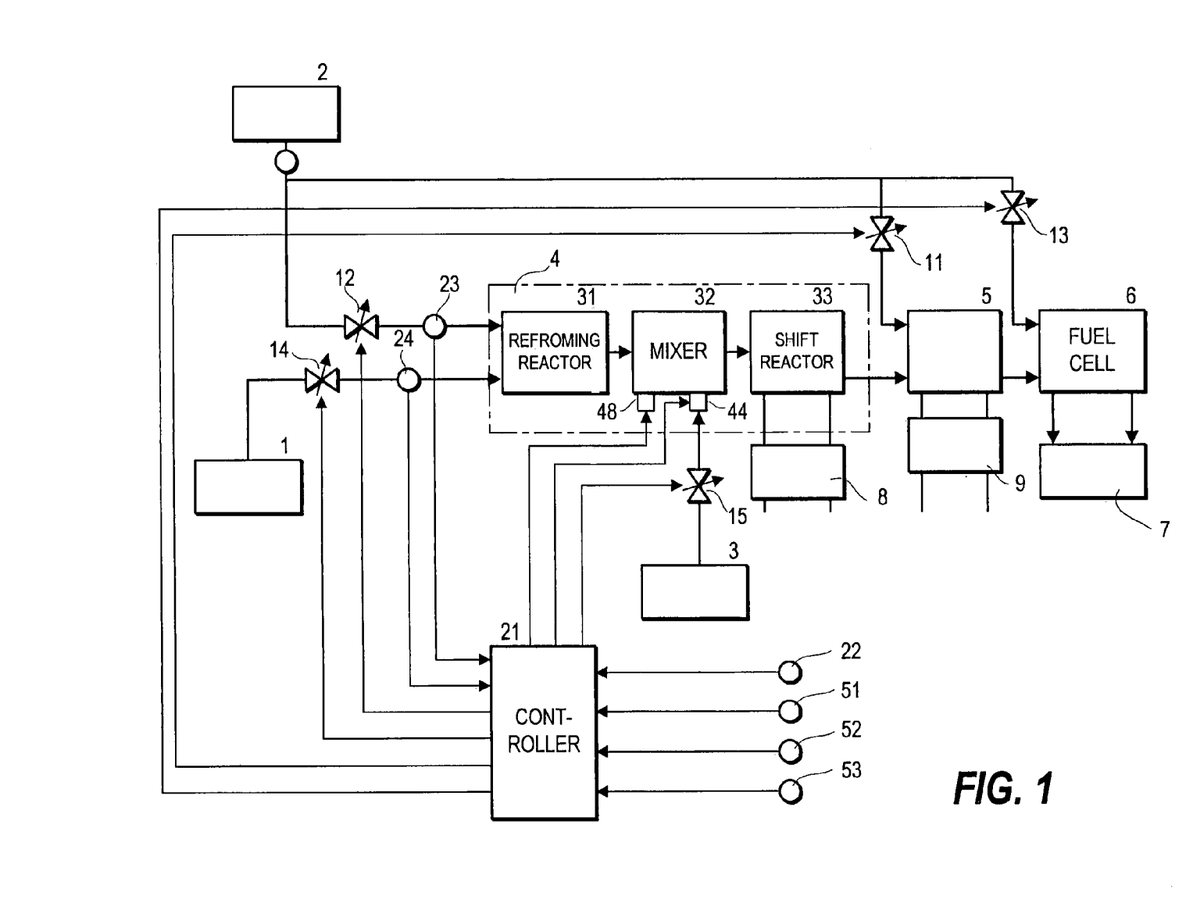
FIG. 1 is a schematic diagram of a fuel reforming system according to the present invention.

The basic construction and operation of the fuel reforming system according to this invention will first be described referring to FIG. 1 of the drawings. Methanol from a methanol feeder 1 is sent to an evaporator (not shown), heated and vaporized, and methanol vapor is supplied to a reformer 4. Air from an air feeder 2 is also supplied to the reformer 4, and water is supplied to the reformer 4 from a water feeder 3.

The reformer 4 is provided with a reforming reactor 31, mixer 32 and shift reactor 33. In the reforming reactor 31, the following catalytic reactions occur:

$$CH_3OH+(\tfrac{1}{2})O_2 \Longleftrightarrow CO_2+2H_2 \qquad (1)$$

$$CH_3OH+H_2O \Longleftrightarrow CO_2+3H_2 \qquad (2)$$

The methanol is thereby reformed, and hydrogen-rich reformate gas is generated.

Equation (1) is a partial oxidation reaction (exothermic reaction) of methanol, and equation (2) is a steam reaction (endothermic reaction) of methanol. The reaction of equation (2) proceeds, as mainly shown below.

$$CH_3OH \Longleftrightarrow CO+2H_2 \qquad (3)$$

$$CO+H_2O \Longleftrightarrow CO_2+H_2 \qquad (4)$$

Equation (3) is a decomposition reaction (endothermic reaction) of methanol, and equation (4) is a shift reaction (exothermic reaction) of carbon monoxide. The reforming reactor 31 runs under autothermal conditions wherein the heat liberated and heat absorbed by these reactions, balance. Therefore, if the size and construction of the reforming reactor 31, and the performance of the catalyst, are fixed, the steam amount and air amount corresponding to the methanol amount will essentially be fixed.

If the ratio of the methanol amount consumed by the partial oxidation reaction (POX) to the total amount of methanol supplied is defined as a POX rate, as essentially all the supplied oxygen is used for the partial oxidation reaction (POX) of equation (2), the air amount required for the total methanol amount may be determined from the POX rate.

During startup when the catalyst is at low temperature, the following side reactions also occur at the same time.

$$CH_3OH \Leftrightarrow HCHO + H_2 \quad (5)$$

$$HCHO \Leftrightarrow CO + H_2 \quad (6)$$

The running temperature of the reforming reactor 31 is 300–600° C., and from the thermodynamic chemical equilibrium, reformate gas containing carbon monoxide of the order of several % is obtained. Carbon monoxide poisons the fuel pole electrode catalyst which comprises the platinum etc., of a polymer electrolyte fuel cell 6, and significantly reduces its activity. Thus, it is necessary to supply the fuel cell 6 after the shift reactor 33 and CO treatment reactor (selective oxidation reactor) 5 have reduced the carbon monoxide to several tens–hundreds ppm.

The reformate gas containing several % of carbon monoxide is sent to the shift reactor 33, and carbon monoxide is reduced by the shift reaction of equation (4). The running temperature of the shift reactor 33 is 200–300° C., and due to the thermodynamic chemical equilibrium, reformate gas containing 0.several % is obtained.

The reformate gas in which carbon monoxide was reduced by the shift reaction is sent to the CO treatment reactor 5 where a catalytic oxidation reaction (exothermic reaction) occurs according to the following equation (7):

$$CO + (\tfrac{1}{2})O_2 \Leftrightarrow CO_2 \quad (7)$$

The carbon monoxide is thereby further reduced to several tens–hundreds ppm maximum. Required oxygen is supplied by the air feeder 2 as air.

In the CO treatment reactor 5, as the oxidation reaction takes place in a hydrogen atmosphere, a combustion reaction (exothermic reaction) of the hydrogen shown by the following equation (8) also occurs. If the reaction of equation (8) occurs, as the hydrogen amount supplied to the fuel cell 6 decreases, the ease of occurrence of the reaction of equation (8) has a large effect on the efficiency of the reforming system, and on the performance of the fuel cell.

$$H_2 + (\tfrac{1}{2})O_2 \Leftrightarrow H_2O \quad (8)$$

To remove the heat due to the reactions of equations (7), (8) and maintain the running temperature at a few tens of degrees above 100° C., the CO treatment reactor 5 is cooled by air, long life coolant (cooling liquid) or oil in a heat exchanger 9. The temperature of the shift reactor 33 is controlled by the heat exchanger 8.

Thus, reformate gas wherein the carbon monoxide concentration has been reduced to a very low level and air from the air feeder 2 are supplied to the fuel pole and air pole of the fuel cell 6, respectively, and power is generated.

It is difficult to consume all the hydrogen in the reformate gas by the fuel cell 6. Therefore, the fuel pole side exhaust gas which partly contains hydrogen, and the air side exhaust gas which partly contains oxygen, are sent to a catalytic combustion device 7 and burnt. The obtained hot combustion gas is sent to a vaporizer, and is used as energy for vaporizing methanol.

A flowrate control valve 11 controls the flowrate of air supplied to the CO treatment reactor 5, a flowrate control valve 12 controls the flowrate of air supplied to the reforming reactor 31, and a flowrate control valve 13 controls the flowrate of air supplied to the air pole of the fuel cell 6. A flowrate control valve 14 controls the flowrate of methanol supplied to the reforming reactor 31, and a flowrate control valve 15 controls the flowrate of water supplied to the mixer 32.

In vehicles provided with the above-mentioned fuel reforming system, the power generation amount of the fuel cell is controlled by using an accelerator depression amount detected by an accelerator sensor 22 as a required load on the fuel cell. For this purpose, a controller 21, which comprises one, two or more microprocessors, a memory and an input/output interface, computes methanol, air and water amounts (target values) supplied to the reformer 4 as follows based on an accelerator depression amount signal from the accelerator sensor 22.

First, a methanol supply amount target value is computed based on the accelerator depression amount. As the accelerator depression amount (required load) is proportional to the methanol supply amount, the target value of the methanol supply amount according to the accelerator depression amount is computed by looking up a table specifying the relation between the accelerator depression amount and the methanol supply amount.

Next, the air supply amount target value is computed based on the methanol supply amount target value. The target air supply amount is computed so that, for example, a gaseous mixture having the stoichiometric air-fuel ratio is obtained by admixture of methanol and air. The target air supply amount becomes larger, the larger the required load is.

Next, the water supply amount target value is computed based on the methanol supply amount. The ratio of methanol, air and water amounts for optimizing the autothermal reaction and shift reaction is determined as described above, so the target water supply amount can be computed based on the methanol supply amount and this ratio. The target water supply amount also becomes larger, the larger the required load is.

The methanol feeder 1, air feeder 2 and water feeder 3 are driven, and the flowrate control valves 14, 12, 15 are controlled, so that the target methanol supply amount, target air supply amount and target water supply amount computed here are realized. The flowrate sensors 23, 24 are provided for flowrate control.

Figure 2:
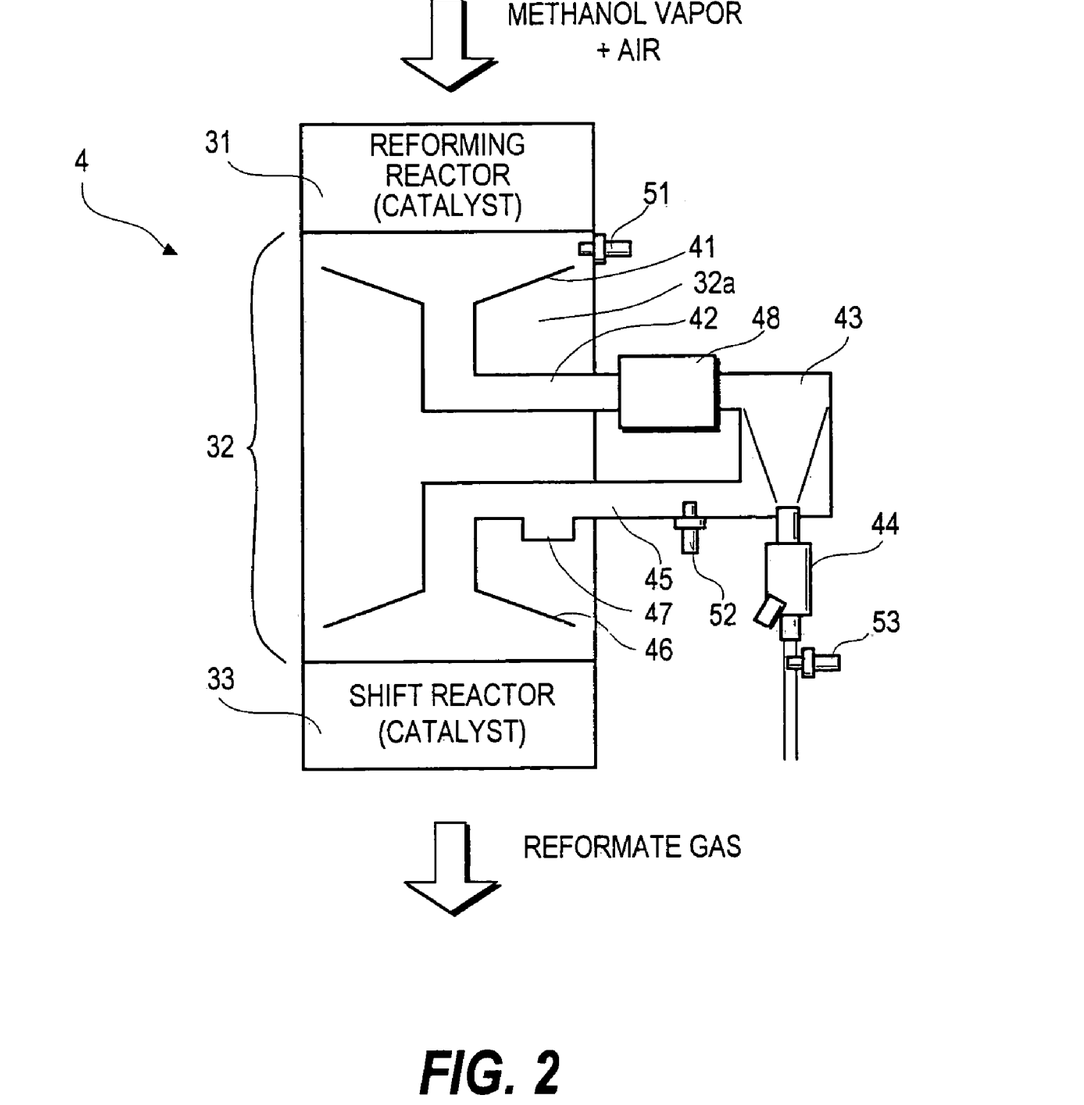
FIG. 2 is a schematic diagram of a reformer.

FIG. 2 shows a schematic diagram of the reformer 4. The cylindrical reformer 4 is arranged so that the axial center coincides with the perpendicular direction. In the upper and lower parts of the diagram, the reforming reactor 31 and shift reactor 33 which support catalysts having a honeycomb structure and have predetermined lengths in the axial direction, are arranged. The gaseous mixture 32 is disposed between the reforming reactor 31 and the shift reactor 33.

Most of the hot gas ($H_2$, $CO_2$, CO, $N_2$) from the reforming reactor 31 which flows down perpendicularly towards the lower part of the figure from the upper part is collected by a horn-shaped gas inlet pipe 41 having a horn aperture, and is led to a premixing chamber 43 longer in the perpendicular direction via a manifold 42 extending in a horizontal direction to the outside of a direct passage 32a which directly connects the reforming reactor 31 and the shift reactor 33.

The premixing chamber 43 has a predetermined space. A water injection valve 44 is provided on the undersurface of the premixing chamber 43. When the water injection valve 44 opens in response to a pulse signal from the controller 21, water supplied from the feeder 3 is injected with a predetermined width vertically upwards. The reason why water is injected vertically upwards is to hold the injected water in the premixing chamber 43 for a long time, and to promote vaporization of water. The water injection valve 44 can vary the water injection amount by adjusting the pulse signal from the controller 21.

When the water injected from the water injection valve 44 is in the premixing chamber 43, and passes through a communicating passage 45 connecting the premixing chamber 43 and the shift reactor 33, vaporization is promoted by the hot gas from the reforming reactor 31. The water vapor mixes with the hot gas from the reforming reactor 31, and is introduced from a horn-shaped gas exhaust pipe 46 to the shift reactor 33.

A water collection chamber 47 which traps water in the liquid phase is provided midway in the communicating passage 45 so that water which did not vaporize is not introduced into the shift reactor 33. As shown in FIG. 2, the water collection chamber 47 is formed as a depression under the communicating passage 45, but it may have any construction provided that it can trap water in the liquid phase.

Also, part of the hot gas which was not collected by the horn-shaped gas inlet pipe 41 flows downwards via the direct passage 32a, and is introduced to the shift reactor 33 while heating the peripheral surface of the manifold 42 and communicating passage 45 crossing the inside of the direct passage 32a.

Due to this construction, water is vaporized using gas which reached a high temperature due to the partial oxidation reaction in the reforming reactor 31 and water vapor without water in the liquid phase can be supplied to the shift reactor 33, so it is unnecessary to provide any device or complicated fuel injection apparatus to vaporize the water. Moreover, the gas composition is not affected.

As the temperature of the hot gas from the reforming reactor 31 falls due to the heat of vaporization of water, the load on the heat exchanger 8 for cooling the shift reactor 33 can be reduced by a corresponding amount, and the heat exchanger 8 can be made compact.

As mentioned above, the controller 21 computes the target water supply amount so that the reaction efficiency in the shift reactor 33 is optimal. If the target water amount can be supplied and vaporized, the reaction efficiency in the shift reactor 33 will be optimal.

If the water injection amount actually injected is less than the target amount due to scatter in the injection amount of the water injection valve 44 and the water vaporization amount falls short by this amount, a situation will occur where the reaction efficiency of the shift reactor 33 decreases. Therefore, it is important to determine whether or not the target water amount is actually supplied. However, as the actual water injection amount and vaporization amount cannot be measured, it is difficult to determine whether or not the target water amount is actually supplied by comparing the target value with the actual water injection amount and vaporization amount.

However, there is a correlation between the water vaporization amount, and the decrease in the premixing chamber temperature. If water is supplied according to the target value and all the water supplied becomes steam, the gas temperature drop due to water injection in the premixing chamber can be estimated from the target water supply amount, and the premixing chamber temperature can be estimated by subtracting this gas temperature drop from the reforming reactor outlet temperature. Moreover, if the water injection amount is less and the water vaporization amount is insufficient due to scatter in the water injection amount of the water injection valve 44, the premixing chamber temperature will rise and the gap between the estimated premixing chamber temperature and measured premixing chamber temperature will become large.

Therefore, if the estimated premixing chamber temperature and measured premixing chamber temperature are compared, it can be determined whether or not the water vaporization amount is insufficient due to scatter in the injection amount of the water injection valve 44. Specifically, if the measured premixing chamber temperature and estimated premixing chamber temperature are substantially equal, it can be determined that there is no shortage in the water vaporization amount, and if the measured premixing chamber temperature is higher than the estimated premixing chamber temperature, it can be determined that the water vaporization amount is insufficient due to scatter in the injection amount of the water injection valve 44.

Temperature signals from a temperature sensor 51 which measures the outlet temperature of the reforming reactor 31, a temperature sensor 52 which measures the temperature of the premixing chamber 43, and a temperature sensor 53 which measures the, temperature of the water which is to be injected from the water injection valve 44, are input into the controller 21. In the controller 21, a gas temperature decrease amount in the premixing chamber 43 due to water injection is estimated from the target water supply amount, and a value obtained by subtracting this gas temperature decrease amount from the measured reforming reactor outlet temperature is computed as a premixing chamber temperature estimation value. When the measured premixing chamber temperature is higher than the estimated premixing chamber temperature, it is determined that the water vaporization amount is insufficient due to scatter in the injection amount of the water injection valve 44, and the water injection amount from the water injection valve 44 is increased so that the water vaporization amount does not fall short.

In this case, it is necessary to make the water vaporization amount increase with sufficient response during vehicle acceleration when the required load increases sharply. The rate of increase required of the water vaporization amount cannot be met only by using the hot gas from the reforming reactor 31, i.e., the response is poor. Hence, according to this embodiment, an electric heater 48 is provided midway in the manifold 42 on the outside of the direct passage 32a. During acceleration, this electric heater 48 is energized to raise the temperature of the gas introduced into the premixing chamber 43, and the rate of increase in the water vaporization amount during acceleration is enhanced so that the water vaporization amount does not run short during acceleration.

The calculation of water injection amount and heater energization amount performed by the controller 21 will now be described referring to the flowchart of FIG. 3. The flowchart in the figure is executed by the controller 21 at a fixed interval, for example, every 10 milliseconds.

First, in a Step S1, the accelerator depression amount APS from the accelerator sensor 22, a reforming reactor outlet temperature rT1 from the temperature sensor 51, a premixing chamber temperature rT2 from the temperature sensor 52, a temperature Twi of water to be injected from the temperature sensor 53 and a water supply amount target value tws, are read. As mentioned above, the target water supply amount tws is computed by the controller 21, and increases the larger the methanol supply amount is, i.e., the larger the accelerator depression amount is.

Figure 3:
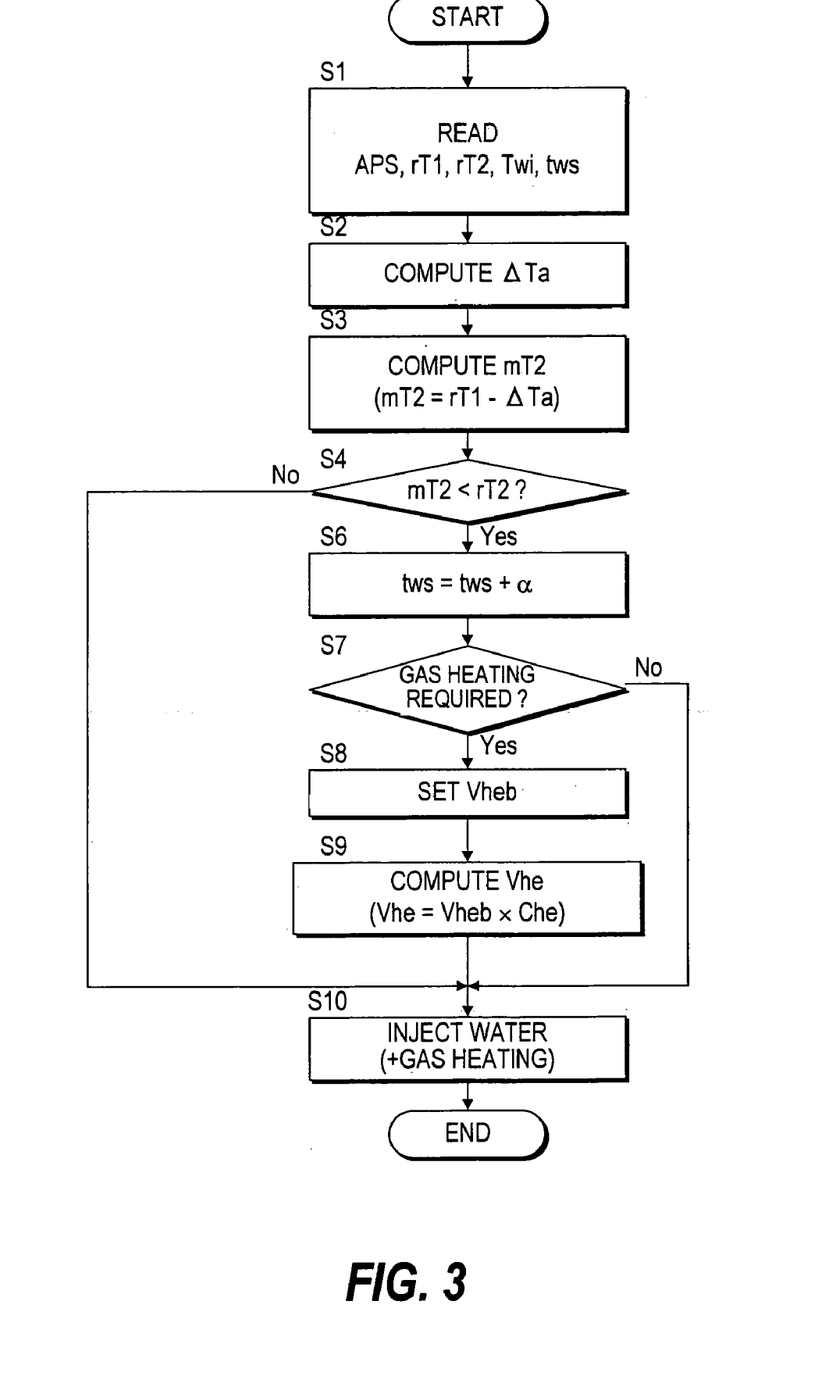
FIG. 3 is a flowchart showing a routine for calculating a water injection amount, and a heater energization amount.
Figure 4:
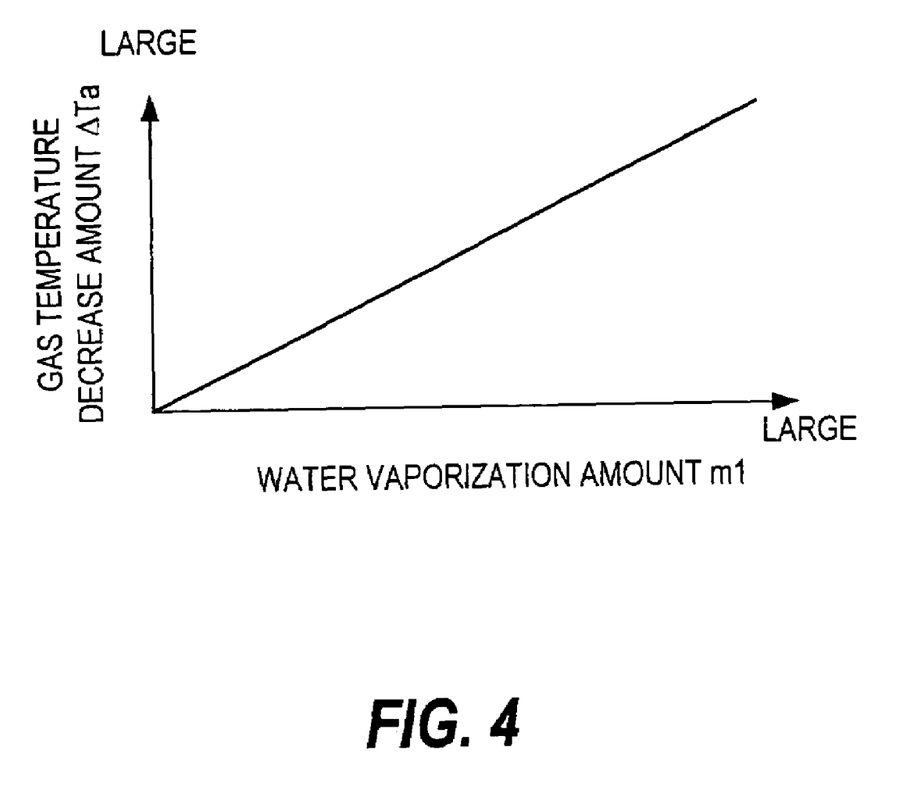
FIG. 4 is a table showing the relation between a water vaporization amount, and a gas temperature decrease amount.

In a Step S2, a decrease amount $\Delta Ta$ of the gas temperature in the premixing chamber 43 when all the supplied water vaporizes is computed, assuming that the whole of the target water supply amount tws is supplied and vaporizes (water vaporization amount m1=target water supply amount tws), by looking up a table shown in FIG. 4. As shown in FIG. 4, the gas temperature decrease amount ΔTa is larger, the larger the water vaporization amount m1 is.

The table shown in FIG. 4 can be created based on experimental results. The following relations exist between the water vaporization amount m1, gas flowrate m2, reforming reactor outlet temperature T1 and premixing chamber temperature T2:

$$m1 \times L1 = m2 \times Ca \times (T1-T2) \quad (9)$$

$$\Delta Ta = T1 - T2 \quad (10)$$

where,
m1=water vaporization amount
L1=heat of vaporization of water
m2=gas flowrate
Ca=specific heat of gas
T1=reforming reactor outlet temperature
T2=premixing chamber temperature
ΔTa=gas temperature decrease amount First, the reforming reactor outlet temperature and the premixing chamber temperature are measured when water is injected from the water injection valve 44 and gas flows at a fixed flowrate. If the measured values of gas flowrate and temperature at that time are substituted in equation (9) (L1, Ca are fixed values), a water vaporization m1 at the temperature T1 and gas flowrate m2, may be computed. In this way, a relation between the water vaporization amount m1 and gas temperature decrease amount ΔTa is obtained. If relations between the water vaporization amount m1 and gas temperature decrease amount ΔTa under other conditions are collected in the same way and the data are plotted, FIG. 4 is obtained.

In a Step S3, using the gas temperature decrease amount ΔTa and the measured reforming reactor outlet temperature rT1, the premixing chamber temperature mT2 is estimated by the following equation (11):

$$mT2 = rT1 - \Delta Ta \quad (11)$$

In a Step S4, the estimated premixing chamber temperature mT2 and the measured premixing chamber temperature rT2 are compared, and it is determined whether or not the water vaporization amount is insufficient. When the estimated premixing chamber temperature mT2 and the measured premixing chamber temperature rT2 are equal, the actual gas temperature of the premixing chamber is the estimated temperature, so the target water supply amount is injected, and there is no shortage in the water vaporization amount. Therefore, the routine proceeds to a Step S10 without correcting the water supply amount target value tws.

On the other hand, when the measured premixing chamber temperature rT2 is higher than the estimated premixing chamber temperature mT2, the water injection amount (i.e., the water vaporization amount) is insufficient due to the scatter in the injection amount of the water injection valve 44, and the gas temperature has not fallen to the estimated temperature. In this case, to determine that the water vaporization amount is insufficient and to increase the water injection amount from the water injection valve 44, the routine proceeds to a Step S6, and a value obtained by adding a predetermined value α to the target water supply-amount tws is set as an new target water supply amount tws.

The water vaporization amount increases due to increase of the water injection amount, and in the steady state, the water injection amount is repetitively increased at every computation period of FIG. 3.

Subsequently, the premixing chamber temperature rT2 falls, and if the premixing chamber temperature rT2 falls below the estimated premixing chamber temperature mT2, the routine cannot proceed from the Step S4 to the Step S6, and the water injection amount is not increased any further. That is, the target water supply amount is increased until the water vaporization amount is no longer insufficient.

Figure 5:
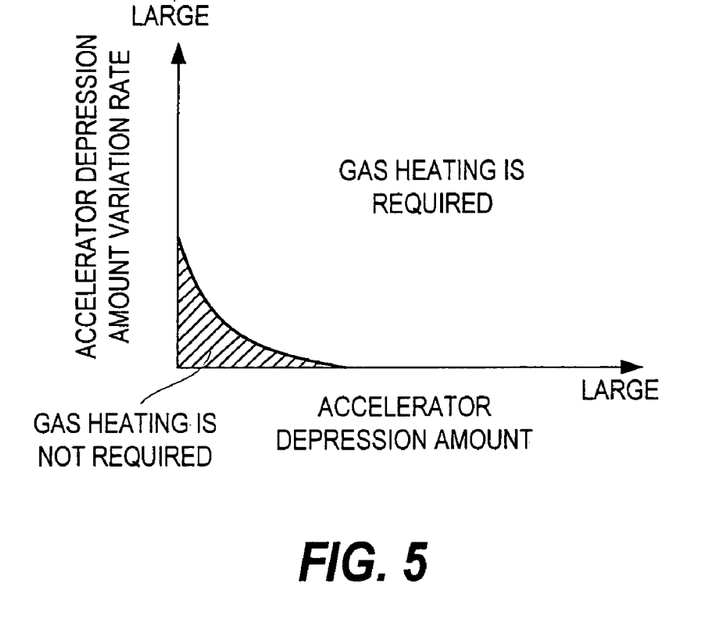
FIG. 5 is a map showing a region in which gas heating is required, and a region in which gas heating is not required.

In a Step S7, it is determined whether it is necessary to heat the gas introduced into the premixing chamber 43 by the electric heater 48, using the map of FIG. 5, from the accelerator depression amount (required load) and accelerator depression amount variation rate (variation amount of accelerator depression amount in every computation period). The horizontal axis of FIG. 5 is the accelerator depression amount (required load), and the vertical axis is the accelerator depression amount variation rate (required load variation rate). A region such as the low load, low load variation rate steady state, i.e., a region wherein the variation rate of the required load is smaller than the predetermined value determined according to the required load, is set as a region in which gas heating is unnecessary (shaded region in the diagram), and other regions (e.g., during acceleration), i.e. regions wherein the variation rate of the required load is larger than the predetermined value determined according to the required load, are set as regions in which gas heating is required.

The reason why the gas entering the premixing chamber 43 is heated in the region where the load variation rate is large and the region where the load is large, is because the water vaporization amount cannot be increased immediately in response to a load variation merely by increasing the water vaporization amount during acceleration when the load variation is sharp, so the gas entering the premixing chamber 43 is heated to raise its temperature and increase the rate of increase of the water vaporization amount.

If the point determined by the accelerator depression amount and accelerator depression amount variation rate lies within the region where gas heating is unnecessary such as the steady state running region, the routine skips the steps S8, S9 and advances to the Step S10.

On the other hand, if the point determined by the accelerator depression amount and accelerator depression amount variation rate lies within the region where gas heating is required such as the acceleration running region, the routine proceeds from the Step S7 to the Step S8, and the basic value Vhe of the heater energization amount is set. In the region where gas heating is required, as shown in FIG. 6, the heater energization amount basic value Vhe is set to be larger, the larger the accelerator depression amount variation rate is, or the larger the accelerator depression amount is.

Figure 6:
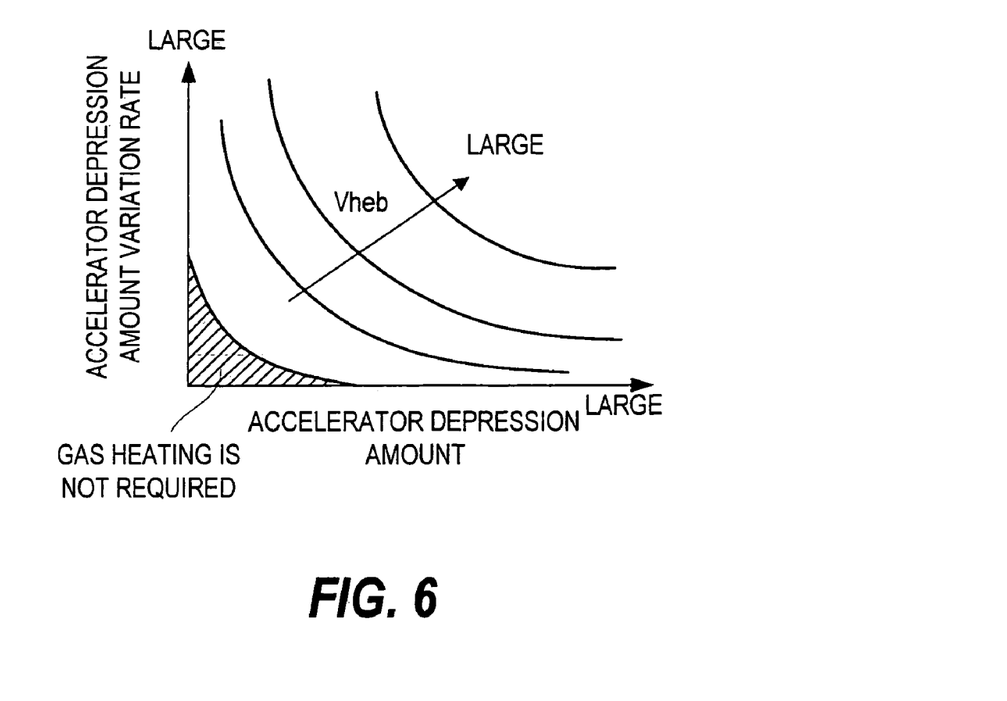
FIG. 6 is a map for computing a heater energization amount basic value.
Figure 7:
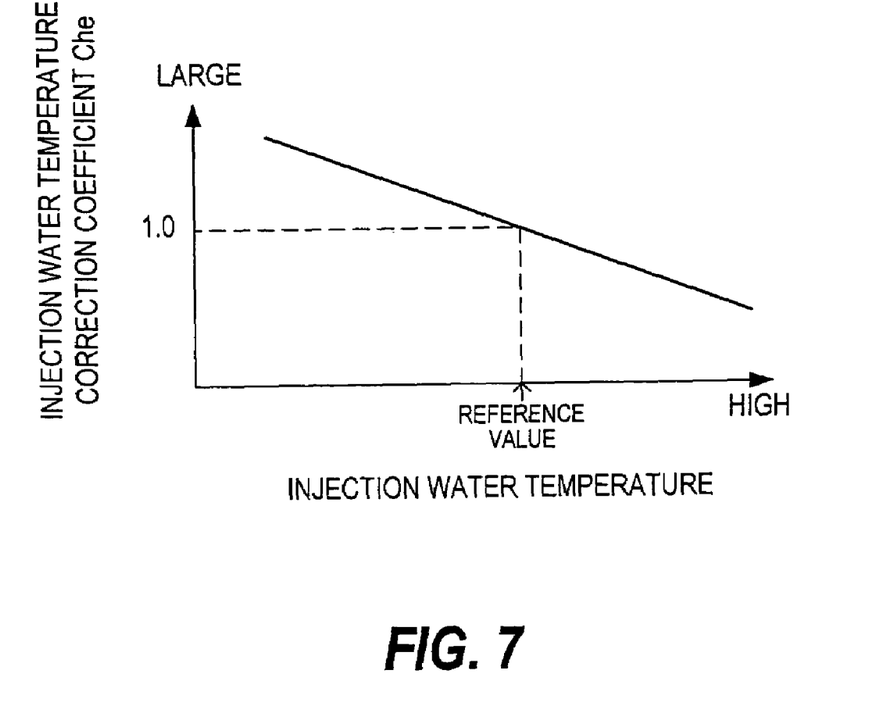
FIG. 7 is a table for calculating an injection water temperature correction coefficient for the heater energization amount.

The heater energization amount basic value Vheb is the optimal value when the injection water temperature is a reference injection water temperature (injection water temperature when the map of FIG. 6 is created), so when the injection water temperature is less than the reference injection water temperature, if the heater is energized by the basic value Vheb, the heater energization amount is insufficient and the water vaporization amount is insufficient. Conversely, when the injection water temperature is higher than this reference injection water temperature, if the heater is energized by the basic value Vheb, the heater energization amount is too large and the water vaporization amount is excessive. Therefore, in the Step S9, the table shown in FIG. 7 is looked up to compute an injection water temperature correction coefficient Che of the heater energization amount, and a value obtained by multiplying this injection water temperature correction coefficient Che by the heater energization amount basic value Vheb, is set as the heater energization amount Vhe. By multiplying the injection water temperature correction coefficient Che, the heater energization amount Vhe is corrected to be larger so that the water vaporization amount increases when the injection water temperature is lower than the reference injection water temperature, and conversely, the heater energization amount Vhe is corrected to be smaller so that the water vaporization amount decreases when the injection water temperature is higher than the reference injection water temperature.

In the Step S10, the injection pulse width of the water injection valve 44 is controlled so that the target water supply amount tws set in the steps S5, S6 is injected from the water injection valve 44 and, if necessary, the energization amount supplied to the electric heater 48 is controlled so that the heater energization amount Vhe computed in the Step S9 is supplied to the electric heater 48.

By controlling the water injection amount injected by the water injection valve 44, and the energization amount supplied to the electric heater 48, the following effects are obtained.

(1) When the measured value and estimated value of the premixing chamber temperature coincide, the required water vaporization amount is produced in the premixing chamber 43 by the water injected from the water injection valve 44, and when the measured value is higher than the estimated value, the required water vaporization amount is not produced in the premixing chamber 43 due to scatter in the injection amount of the water injection valve 44. According to this embodiment, in the latter case, the water injection amount from the water injection valve 44 is increased and the water vaporization amount is increased, so the required water vaporization amount is supplied to the shift reactor 33 even if there is scatter in the injection amount of the water injection valve 44.

(2) When the variation rate of the required load is large, for example, during acceleration, it is necessary to rapidly increase the water vaporization amount. If the water injection amount is simply increased at this time, the increase of water vaporization amount is delayed. According to this embodiment, when the variation rate of the required load is large, gas is heated by the electric heater 48, so the increase of water vaporization amount is more rapid corresponding to the temperature rise of hot gas due to the electric heater 48, and the water vaporization amount can be rapidly increased during acceleration.

(3) The electric heater 48 consumes electrical energy, so fuel cost-performance is poorer the larger the number of occasions when the electric heater 48 is operated. However, according to this embodiment, the use of the electric heater 48 is limited to transient states such as during acceleration, so the effect of heating by the electric heater 48 on fuel-cost performance is small.

(4) As the basic value of the heater energization amount is an optimal value when the injection water temperature is the reference injection water temperature, if the heater energization amount is not modified according to the injection water temperature when the injection water temperature is less than the reference injection water temperature, the heater energization amount is insufficient and the water vaporization amount is insufficient. Conversely, when the injection water temperature is higher than the reference injection water temperature, the heater energization amount is too large and the water vaporization amount is excessive. However, according to this embodiment, the heater energization amount is corrected according to the measured injection water temperature, so even if the injection water temperature does not coincide with the reference injection water temperature, the heater energization amount may be supplied without excess or insufficiency.

(5) According to this embodiment, water which was not vaporized in the premixing chamber 43 accumulates in the water collection chamber 47, so entry of water in the liquid phase to the shift reactor 33 is definitely prevented.

Figure 8A:
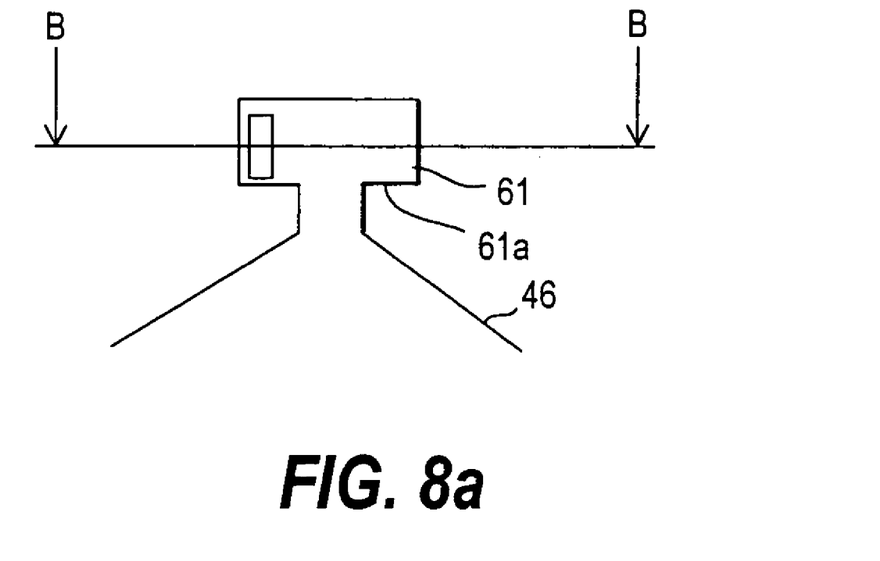
FIGS. 8a, 8b are schematic diagrams showing part of a mixer according to a second embodiment.
Figure 8B:
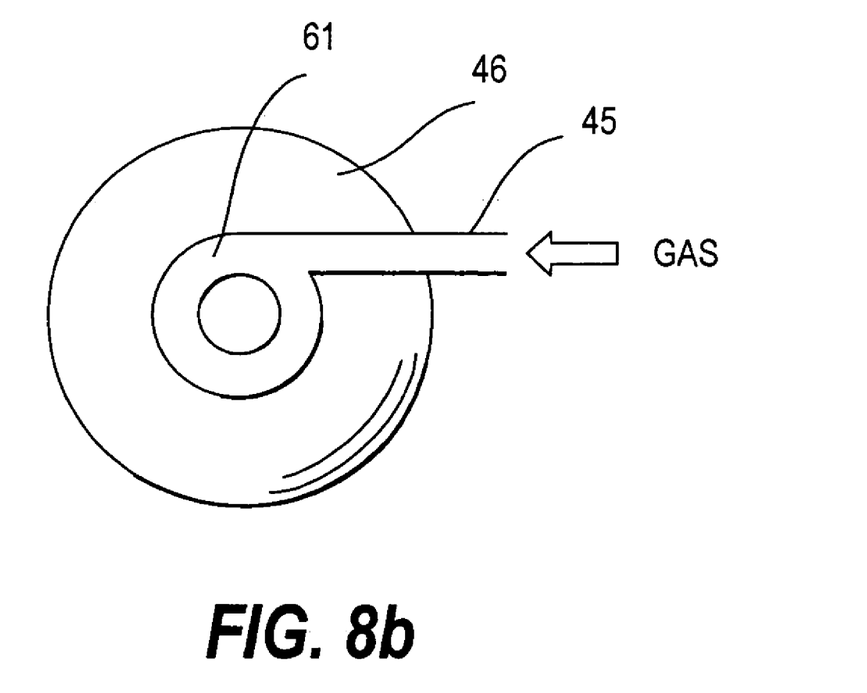

Next, FIGS. 8a, 8b show a second embodiment. FIG. 8a is a schematic view of part of the mixer 32, and FIG. 8b is a section through B—B in FIG. 8a. The second embodiment provides a hollow, cylindrical spiral chamber 61 at a position where the communicating passage 45 which extends in a horizontal direction, bends vertically downwards. The communicating passage 45 is connected in a tangential direction at a point offset from the center of the spiral chamber 61, as shown in FIG. 8b. A horn-shaped gas discharge pipe 46 opens on an undersurface 61a of the spiral chamber 61, as shown in FIG. 8a.

When hot gas from the reforming reactor 31 and water spray injected by the water injection valve 44 flow into the spiral chamber 61, swirl is set up inside the spiral chamber 61. This swirl becomes stronger towards the center. Mixing of water and hot gas is promoted by the swirl, and the gaseous mixture becomes homogeneous. As a result, decrease of efficiency due to non-homogeneity of the gaseous mixture in the shift reactor 33 can be prevented.

Figure 9A:
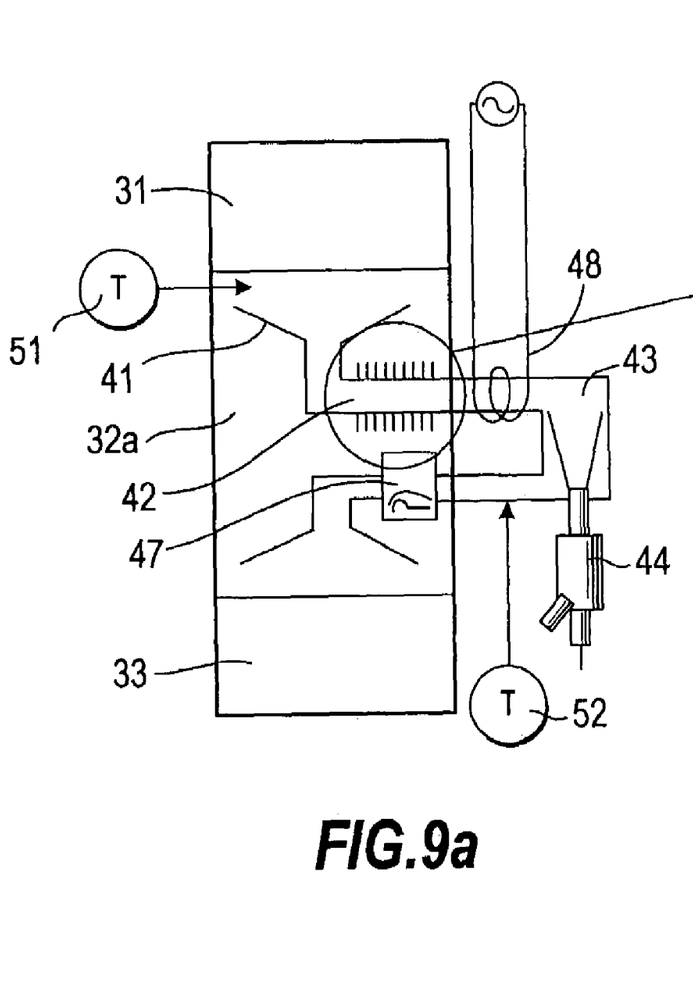
FIGS. 9a–9c are schematic diagrams of a reformer according to a third embodiment.

FIG. 9a shows the schematic view of the reformer 4 according to a third embodiment. This replaces FIG. 2 of the first embodiment. According to the third embodiment, a fin 71 to increase surface area is provided on the peripheral surface of the manifold 42 which is situated in the direct passage 32a of the mixer 32.

Figure 9B:
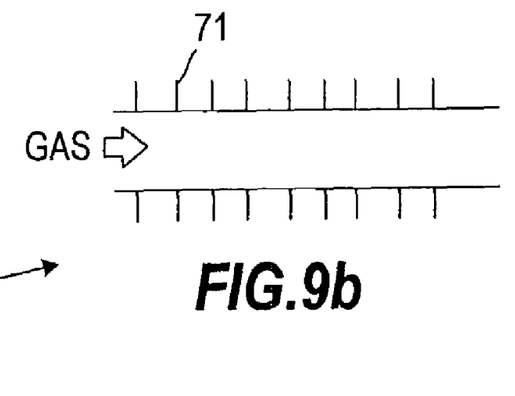
Figure 9C:
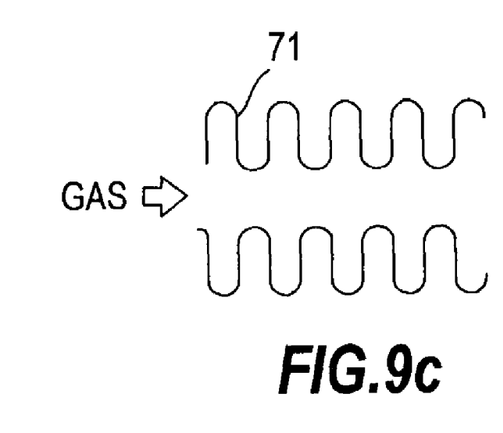

Due to this construction, heat transfer with the hot gas introduced directly to the shift reactor 33 via the direct passage 32a from the reforming reactor 31 is promoted, and the interior of the premixing chamber 43 can be maintained at a higher temperature than in the first embodiment. The fin 71 may take several forms, for example it may have a linear cross-section as shown in FIG. 9b, or it may have a wave-shaped cross-section as shown in FIG. 9c.

Figure 10:
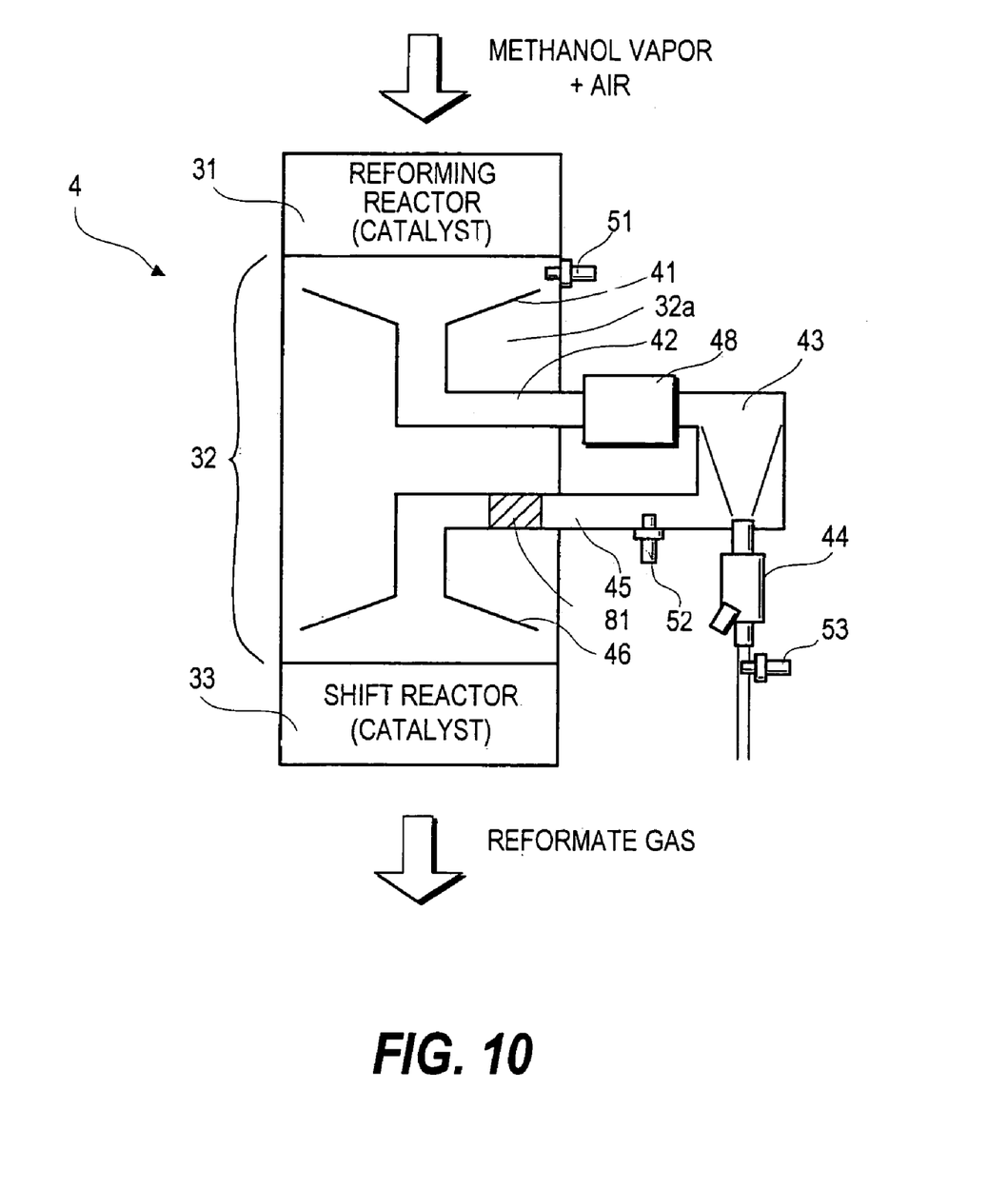
FIG. 10 is similar to FIG. 2, but showing a schematic view of a reformer according to a fourth embodiment.
Figure 11:
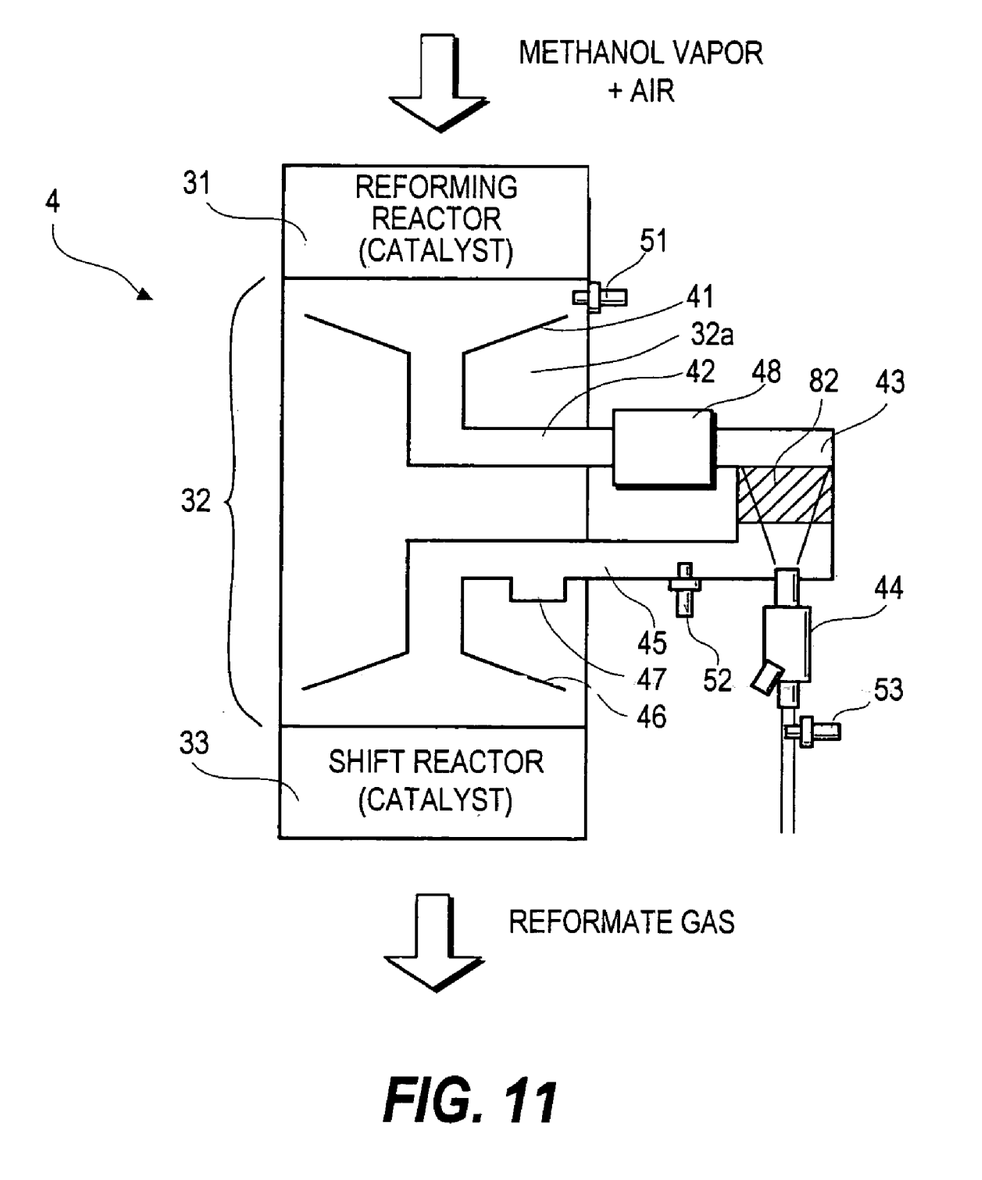
FIG. 11 is similar to FIG. 2, but showing a schematic view of a reformer according to a fifth embodiment.
Figure 12:
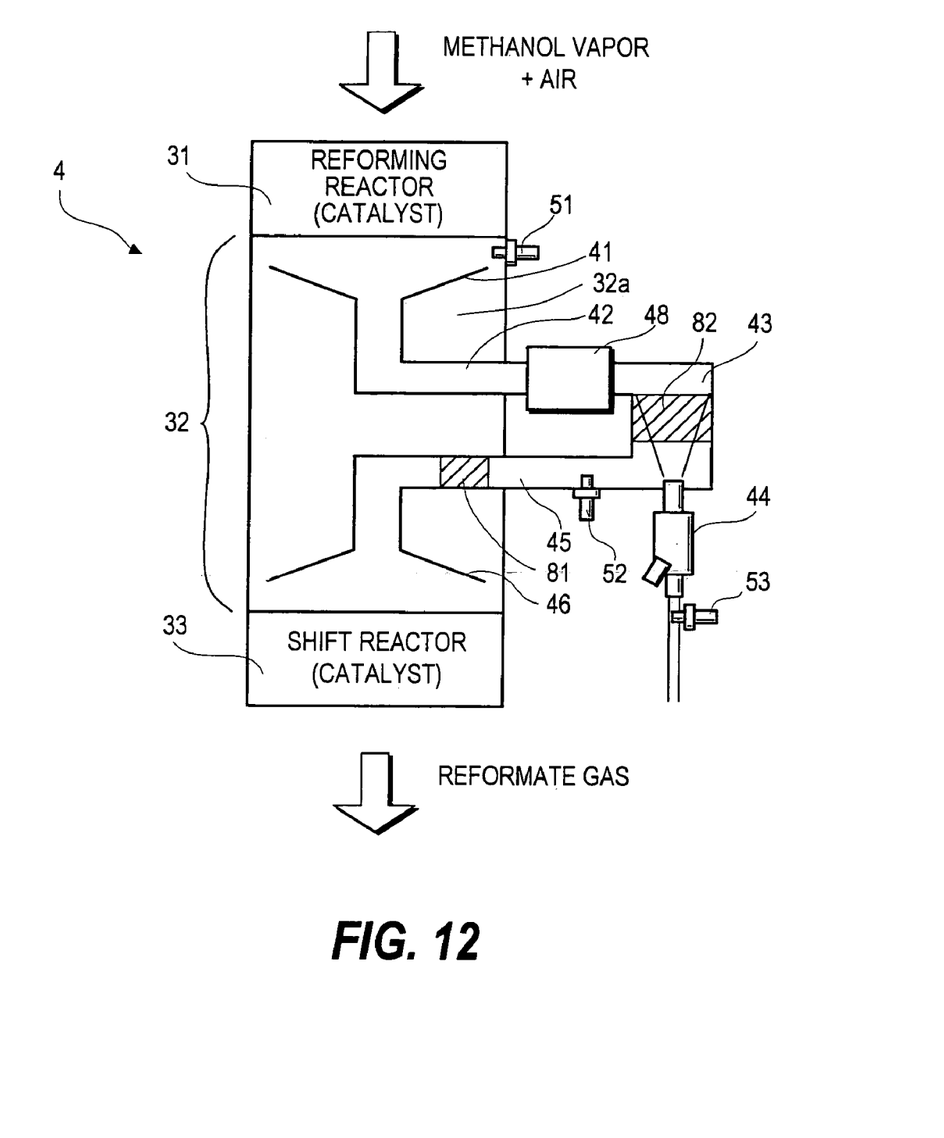
FIG. 12 is similar to FIG. 2, but showing a schematic view of a reformer according to a sixth embodiment.

FIG. 10, FIG. 11, FIG. 12 are schematic diagrams of the reactor 4 according to fourth, fifth and sixth embodiments, and replace FIG. 2 of the first embodiment.

In the fourth embodiment shown in FIG. 10, a porous body 81 situated midway in the communicating passage 45 crossing the direct passage 32a which traps part of the water spray which could not be vaporized in the premixing chamber 43, is provided. As a result, the contact time between water spray which could not be vaporized in the premixing chamber 43 and hot gas flowing inside the porous body 81, is lengthened, and the vaporization of trapped water spray is promoted.

In the fifth embodiment shown in FIG. 11, a porous body 82 is provided at a position in the premixing chamber 43 reached directly by water spray injected from the water injection valve 44. If the premixing chamber 43 is surrounded by atmospheric air, and water spray injected from the water injection valve 44 adheres to the wall surface of the premixing chamber 43, it is cooled to become water and vaporization is prevented. However, if the porous body 82 is installed at a position where water spray injected by the water injection valve 44 is effectively trapped, water spray is prevented from adhering to the wall surface of the premixing chamber 43 and becoming water again. Hence, the contact time of the water trapped by the porous body 82 with the hot gas flowing inside the porous body 82 increases, and vaporization is promoted. Further, as adherence of water spray to the wall of the premixing chamber 43 is prevented by the porous body 82 and thus, there is no need to give a large volume to the premixing chamber to prevent adherence of water spray to the wall, the volume of the premixing chamber 43 can be reduced.

The sixth embodiment shown in FIG. 12 is a combination of the fourth and fifth embodiments. Water spray injected by the water injection valve 44 strikes the porous body 82, and most vaporizes inside the porous body 82 and the premixing chamber 43. The remaining part of the water spray which was not vaporized is trapped by the porous body 81 situated in the communicating passage 45, and vaporization of the water spray trapped inside is promoted. According to the sixth embodiment, the premixing chamber 43 can be made more compact and vaporization of the water spray can be promoted.

Figure 13A:
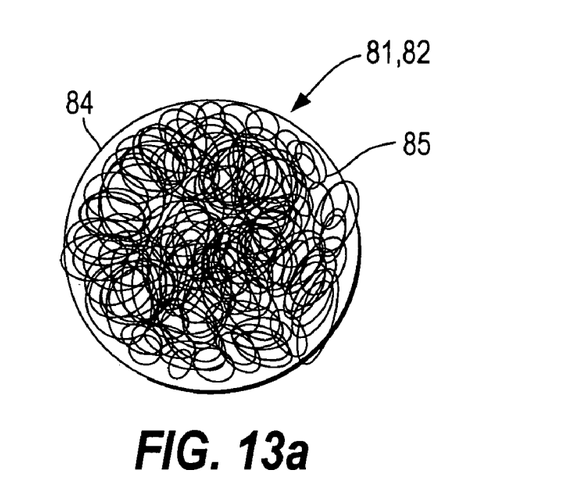
FIGS. 13a–13c are schematic diagrams of a porous body.
Figure 13B:
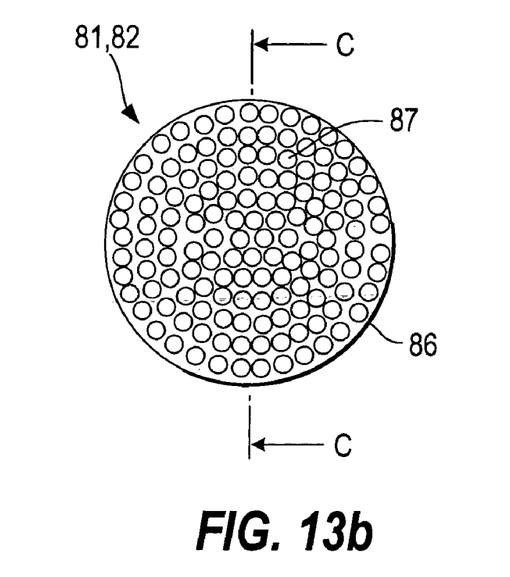
Figure 13C:
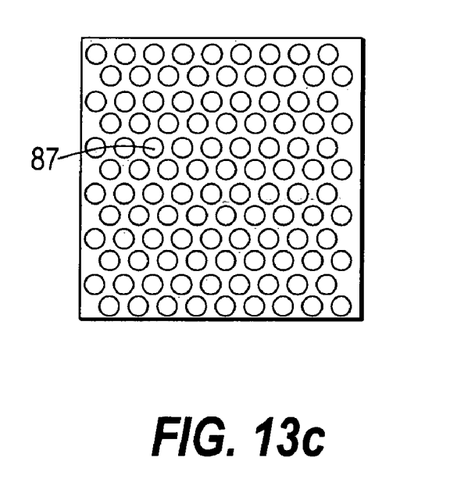

To enable water spray to diffuse easily, to homogenize water spray distribution and to promote vaporization, a mass of unevenly wound metal wires 85 can be packed inside a cylindrical case 84, for example as shown in FIG. 13a, and can be used as the porous body 81 or 82. Alternatively, a cylindrical foam body 86 made of foam material and having numerous holes 87 may also be used as the porous body 81 or 82, as shown in FIG. 13b, FIG. 13c (FIG. 13c is a section through C—C in FIG. 13b). The holes 87 are arranged randomly.

In the above-mentioned embodiments, the case was described where the water injection amount from the water injection valve 44 was increased when the water vaporization amount was insufficient, but the electrical heater 48 may also be energized to heat the gas instead. By increasing the heater energization amount, the vaporization of the injected water is promoted and the water vaporization amount can be increased. Further, the water injection amount can be increased and the electrical heater 48 energized as well. However, whereas heat energy is required for gas heating by the electrical heater 48, water injection does not require heat energy, so according to the above mentioned embodiments, increase of water injection amount is given priority, and in the acceleration running region where the response of the water vaporization amount due to water injection is poor, the electrical heater 48 is energized to improve the response of the water vaporization amount due to water injection.

According to this embodiment, methanol was given as an example of a hydrocarbon fuel, but the invention is not limited thereto.

The entire contents of Japanese Patent Applications P2002-13962 (filed Jan. 23, 2002) and P2002-147421 (filed May 22, 2002) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

INDUSTRIAL FIELD OF APPLICATION

This invention may be applied to fuel reforming systems of fuel cells. It may of course also be applied to fuel reforming systems not for vehicle use. The invention provides a method of promoting water vaporization by means of a simple construction, and as it reduces the load on a heat exchanger which cools a shift reactor so that it can be made more compact, it simplifies the construction of the fuel reforming system and makes it more compact.

The invention claimed is:

1. A fuel reforming system of a fuel cell, comprising:
a reforming reactor into which hydrocarbon fuel and oxygen are introduced to perform a partial oxidation reaction;
a mixer provided downstream the reforming reactor, which injects water into gas heated by the partial oxidation reaction to vaporize the water, and mix the vaporized water with the gas;
a shift reactor provided downstream the mixer, into which the gas containing vaporized water is introduced, and which performs a shift reaction; and
a direct passage which leads gas from the reforming reactor to the shift reactor;
wherein the mixer comprises:
a manifold which crosses the direct passage and collects a part of gas from the reforming reactor;
a premixer into which gas is led via the manifold;
a water injection device which injects water into the part of gas led into the premixer; and
a communicating passage which leads the mixture of water injected from the water injection device and the part of gas into the shift reactor, and
a remainder of gas which is not collected by the manifold is introduced to the shift reactor via the direct passage.

2. The fuel reforming system as defined in claim 1, further comprising:
a sensor which measures the temperature of the premixer; and
a controller which functions to:
estimate the temperature of the premixer based on the water amount to be injected from the water injection device; and
increase the water injection amount from the water injection device when the measured premixer temperature is higher than the estimated premixer temperature.

3. The fuel reforming system as defined in claim 2, further comprising:
a sensor which measures the outlet temperature of the reforming reactor, wherein the controller further functions to:
estimate the temperature decrease amount of the premixer due to the vaporization of water to be injected from the water injection device, and
estimate the premixer temperature by subtracting the temperature decrease amount estimated from the measured outlet temperature of the reforming reactor.

4. The fuel reforming system as defined in claim 1, further comprising:
a sensor which measures the temperature of the premixer;
a heating mechanism which heats the gas introduced to the premixer; and
a controller which functions to:
estimate the temperature of the premixer based on the water amount to be injected from the water injection device; and
heat the gas introduced to the premixer by the heating mechanism when the measured premixer temperature is higher than the estimated premixer temperature.

5. The fuel reforming system as defined in claim 4, further comprising:
a sensor which measures the outlet temperature of the reforming reactor, wherein the controller further functions to:

estimate the temperature decrease amount of the premixer due to the vaporization of water to be injected from the water injection device, and estimate the premixer temperature by subtracting the temperature decrease amount estimated from the measured outlet temperature of the reforming reactor.

6. The fuel reforming system as defined in claim 2, further comprising:

a heating mechanism which heats gas introduced to the premixer, wherein the controller further functions to:

increase the water injection amount from the water injection device when the measured premixer temperature is higher than the estimated premixer temperature, and the variation rate of the load required by the fuel cell is less than a predetermined value, and:

increase the water injection amount from the water injection device, and heat the gas introduced to the premixer by the heating mechanism, when the measured premixer temperature is higher than the estimated premixer temperature, and the variation rate of the load required by the fuel cell is more than the predetermined value.

7. The fuel reforming system as defined in claim 6, wherein the heating mechanism is an electrical heater.

8. The fuel reforming system as defined in claim 7, wherein the controller further functions to:

increase the energization amount supplied to the electrical heater the larger the variation rate of the required load is, when the measured premixer temperature is higher than the estimated premixer temperature, and the variation rate of the load required by the fuel cell is more than the predetermined value.

9. The fuel reforming system as defined in claim 8, further comprising:

a sensor which measures the water temperature of the water to be injected from the water injection device, and;

the controller further functions to correct the energization amount supplied to the electrical heater according to the measured injection water temperature.

10. The fuel reforming system as defined in claim 1, wherein:

a water collection chamber, which collects water not vaporized in the premixer, is installed midway in the communicating passage.

11. The fuel reforming system as defined in claim 1, wherein:

the external surface area of the part of the manifold which crosses the interior of the direct passage is increased by providing a fin on the peripheral surface of the manifold.

12. The fuel reforming system as defined in claim 1, wherein:

a porous body which traps water not vaporized by the premixer is installed in the communicating passage.

13. The fuel reforming system as defined in claim 12, wherein the porous body is a mass of fine metal wire.

14. The fuel reforming system as defined in claim 12, wherein the porous body is a foam material comprising small holes.

15. The fuel reforming system as defined in claim 1, wherein:

a porous body is installed at a position of the premixer directly reached by water spray injected from the water injection device.

16. The fuel reforming system as defined in claim 15, wherein the porous body is a mass of fine metal wire.

17. The fuel reforming system as defined in claim 15, wherein the porous body is a foam material comprising small holes.

* * * * *